Aug. 26, 1947.  G. L. LARISON  2,426,360

VEHICLE SUSPENSION WARNING INDICATOR CONTROL

Filed Feb. 12, 1945  2 Sheets-Sheet 1

INVENTOR.
GLENN L. LARISON

Aug. 26, 1947.　　　　G. L. LARISON　　　　2,426,360
VEHICLE SUSPENSION WARNING INDICATOR CONTROL
Filed Feb. 12, 1945　　　　2 Sheets-Sheet 2

INVENTOR.
GLENN L. LARISON
BY

Patented Aug. 26, 1947

2,426,360

UNITED STATES PATENT OFFICE 2,426,360

VEHICLE SUSPENSION WARNING INDICATOR CONTROL

Glenn L. Larison, La Grande, Oreg., assignor to Larison Compensating Axle Corporation, a corporation of Oregon Application February 12, 1945, Serial No. 577,565

2 Claims. (Cl. 200—58)

This invention relates in general to devices adapted to be installed on automobiles, trucks, trailers and the like to indicate certain failures in the wheels or vehicle suspension, such as excessive deflation of tires due to punctures, etc.

More particularly, this invention relates to a device for giving warning of such condition in a vehicle having wheel suspension of a compensating type—that is to say, in a vehicle in which the wheels are mounted in pairs and in which each pair of wheels is so arranged that one wheel of the pair may be raised above the other but with each wheel constantly carrying its share of the load under all normal conditions of travel. Such a wheel mounting is shown, for example, in my U. S. Letters Patent No. 2,349,289, issued May 23, 1944, entitled "Vehicle wheel mounting," and in several of my earlier patents showing similar mountings, and in my pending application Serial No. 512,351, filed under date of November 30, 1943, now Patent Number 2,401,766, and entitled "Vehicle suspension."

In such types of vehicle suspension excessive deflation of the tire on one of the wheels of the pair, causing the spindle of that wheel to be lowered excessively, will cause the other wheel of the pair to be correspondingly raised. On the other hand, failure of any part of one of the wheel carrying assemblies or of any part of the inter-connecting compensating mechanism, or of a cushioning spring associated with either assembly, or with the compensating mechanism, may cause either or both of the wheels to be raised considerably above normal position. If any one of these conditions occurs, it is essential that the driver of the vehicle should have immediate knowledge of the same so that he can stop the vehicle and investigate the trouble and thereby avoid any risk of danger or any unnecessary damage to a deflated tire or to any other part of the vehicle suspension in which failure is present.

The object of this invention is to provide a practical means for giving warning of the existence of any such condition as previously mentioned.

Various devices, particularly for indicating dangerous tire deflation, have previously been invented. For the most part such devices have included downwardly extending members with the bottom ends of the same terminating close to the ground so that excessive tire deflation will cause these to be actuated by being brought into engagement with the road bed or ground. Such devices are entirely impracticable for vehicles which may have to be used on rough roads.

A further object of this invention therefore is to provide a suitable warning device which does not have to extend close to the road bed or be located too low in the vehicle, and which will not prevent the use of the vehicle on rough ground.

A further object is to provide a warning device which will be sturdy, simple and inexpensive.

The manner in which these objects and other advantages are attained by my invention, and the manner in which my invention is employed in a vehicle having a compensating wheel mounting, will be briefly explained with reference to the accompanying drawings in which:

Figure 1 is a side elevation of an 8-wheel trailer with one of the near-side wheels broken away and the other near-side wheel removed for the sake of clarity, the wheel suspension being similar to that described in U. S. Patent No. 2,349,289, previously referred to;

Figure 1:
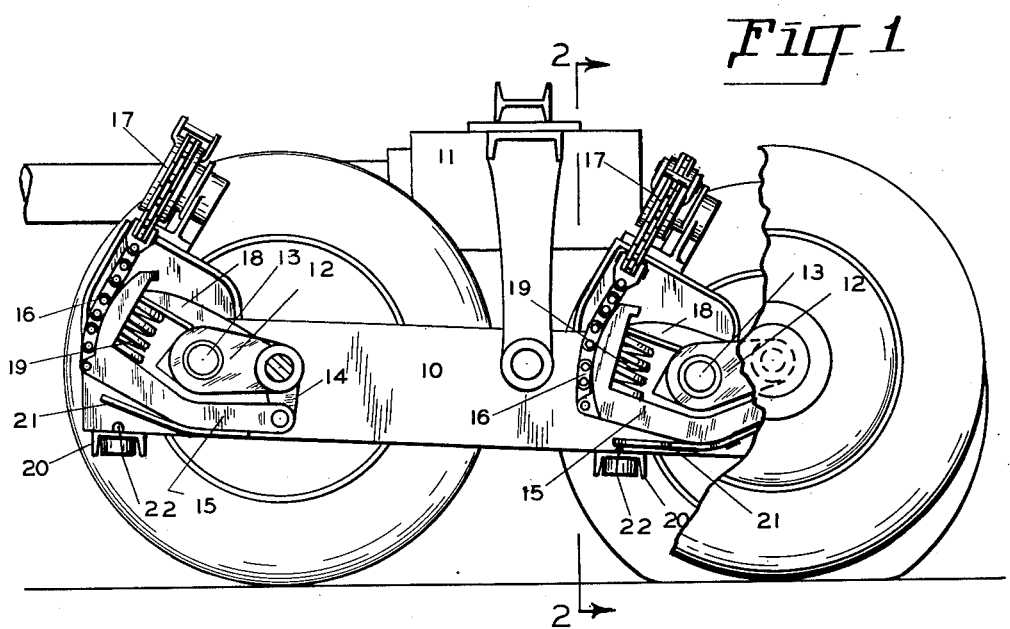
Figure 2:
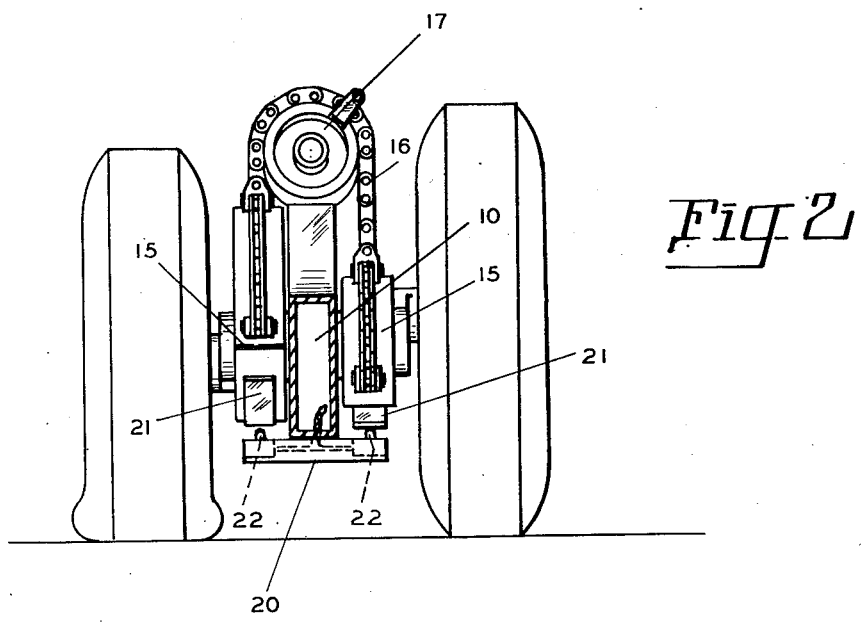
Figure 2 is a section through the near side "walking-beam" of the vehicle of Figure 1, corresponding to the line 2—2 of Figure 1.

In the vehicle illustrated in Figures 1 and 2, the vehicle frame 11 is supported at one side on a "walking-beam" 10, and a pair of wheel-carrying assemblies 12 are mounted near each end of the "walking beam." Each pair of wheel-carrying assemblies is pivoted to a shaft 13 which is mounted in the "walking-beam" 10. Each wheel-carrying assembly has a downwardly extending portion 14 to the lower end of which an associated member or hanger arm 15 is pivotally connected. A chain 16, passing over a compensating wheel 17, connects the other ends of each pair of hanger arms 15. A pawl 18 extends from the hub of each wheel-carrying assembly 12 and engages the top of coil spring 19, the bottom end of the coil spring being seated in the hanger arm 15. Such a vehicle wheel suspension is described more fully in my U. S. Patent No. 2,349,289.

A stop bracket 20 for each pair of wheel-carrying assemblies consists of a small U-shaped bar secured to the bottom of the "walking-beam" 10 and extending transversely. The U-shaped bar is rigidly secured to the "walking-beam" by welding or by any other suitable means and is located below the chain connected ends of the hanger arms 15 as shown in Figure 1. These U-shaped bars or stop brackets 20 extend a short distance from each side of the "walking-beam," as shown in Figure 2, and thus prevent the corresponding ends of the hanger arms from moving below the bottom of the "walking-beam."

An electrical push button switch is mounted in each end of each U-shaped bar or stop bracket 20 and a spring-mounted push button 22 extends upwardly through a suitable hole provided in the bracket. The push button switches are electrically connected with a warning signal (not shown), for example, a buzzer, alarm bell, or light, located at any desired or convenient place so that the depressing of any push button on any stop bracket will cause the warning signal to be operated and the driver of the vehicle to be warned that something is wrong.

A spring member 21 is attached to the bottom of each hanger arm 15, as shown in Figure 1, and is so arranged as to engage the push button 22 and press down on the same when the wheel-carrying assembly is raised sufficiently, thus causing the warning signal to be operated even though the hanger arm may actually not come into contact with the stop bracket. While the spring member 21 could be omitted entirely, this extra spring member enables a more complete control to be maintained. Thus, for example, a tire may be only partially deflated and the lowered position of the wheel with such partially deflated tire would be insufficient to cause the hanger arm of the wheel-carrying assembly of the companion wheel to come into actual contact with the stop bracket. However, it is desirable that the operator under such condition should be advised of the fact that a tire was partially deflated, instead of having to wait until the deflation became complete and possible damage to the tire had meanwhile taken place. Furthermore, contact of the hanger arm with the stop bracket would be undesirable except under extreme conditions; for, as will be apparent from Figure 1, upon engagement of the hanger arm with the stop bracket, the corresponding spring 19 would then cease to cushion further shocks transmitted from the wheel to the "walking-beam." Therefore, if the stop bracket were arranged so as to be engaged by the hanger arm when the tire of the companion wheel became only partially deflated, the vehicle would be less suitable for use on rough ground, inasmuch as the cushioning action of the springs would be more limited in the case of heavier shocks.

Figure 3:
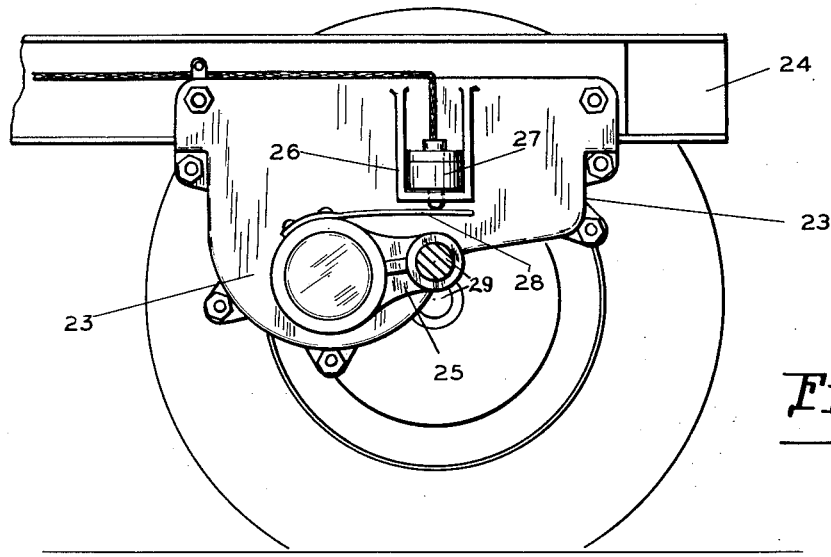
Figure 3 is a sectional side elevation of a portion of a vehicle in which another form of compensating wheel mounting is employed, the section being taken on line 3—3 of Figure 4.
Figure 4:
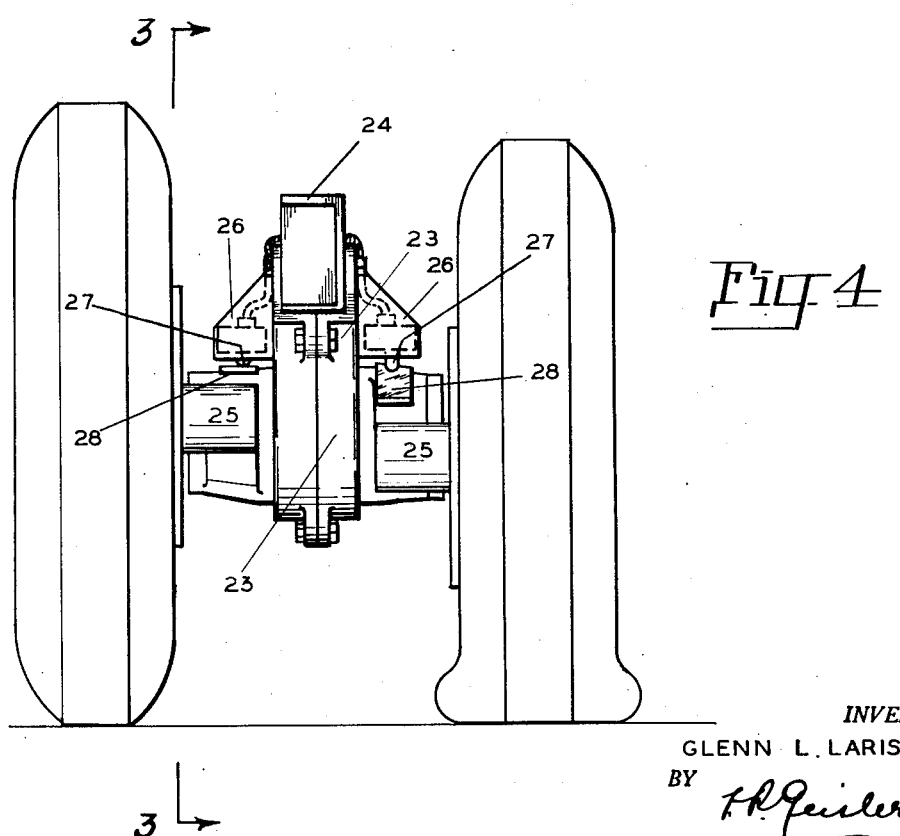
Figure 4 is an end elevation of the pair of wheel-carrying assemblies of the vehicle of Figure 3, this view being taken from the right of Figure 3 and showing both wheels of the pair.

In the wheel suspension shown in Figures 3 and 4, which is similar to that described in my Patent Number 2,401,766, previously referred to, the two wheel-carrying assemblies 25 are interconnected by a differential or compensating mechanism (not shown) located within the housing 23, which housing is secured to a vehicle frame member 24. A suitable cushioning means associated with the compensating mechanism, but not shown, is also provided within the housing 23 as described in my said Patent Number 2,401,766.

A stop bracket 26 is provided on each side of the housing 23 and is located above the corresponding wheel spindle 29. The stop brackets 26 may either be formed integral with the side wall of each housing section or may comprise separate brackets rigidly secured to the housing. An electric push button switch 27 is mounted in each bracket 26 with a spring-mounted push button extending downwardly through a suitable hole provided in the bracket.

A spring member 28 is attached to the top of the hub of each wheel-carrying assembly 25, as shown in Figure 3, and is so arranged as to engage the push button switch 27 when the wheel-carrying assembly is raised sufficiently.

Thus in this form of my invention, as well as that shown in Figures 1 and 2, the additional spring member for contacting the push button will cause the warning signal to be operated even though the wheel-carrying assembly is not raised to the full extent permitted by the stop bracket. The spring member 28 of Figure 3 could be omitted entirely; but, for the reasons previously mentioned, it is preferable to interpose such spring member so that a warning signal can be given if a tire is only partially deflated, for example. Each push button switch 27 is electrically connected with a warning signal device (not shown) as previously mentioned.

Various modifications could be made in the means for mounting the push button switches, and other electric contact elements could, of course, be substituted for the push button switches without departing from the principle of my invention. It would also be possible to arrange the electric switch contact elements to be operated by one of the wheel-carrying assemblies of the pair alone indstead of by both wheel-carrying assemblies. Thus, for example, in Figure 3 a second bracket and push button switch could be attached on the same side of the housing and located below the wheel-carrying assembly in vertical alinement with the bracket and push button switch above the wheel-carrying assembly, and the push button switch on the opposite side of the housing could then be dispensed with entirely. Since the two wheel-carrying assemblies are inter-connected, such an arrangement of two switches on the same side of the housing would be sufficient for indicating whether either assembly was raised or lowered more than a predetermined amount. However, I consider it preferable to have a single switch for each wheel-carrying assembly arranged more or less in the ways which I have indicated.

Although I have thus far described only electrical means as the means by which the warning signal system is operated it would also be possible to employ other means—for example, a pneumatic signal system—in place of the electrically operated system. Thus in Figure 1 a pneumatic bulb could be installed in place of the push button 22, and connected by a suitable pneumatic tube to the warning signal device. While the employment of electrical means would in my opinion be much more practical under ordinary circumstances, my invention could nevertheless be carried out by other means, such as the pneumatic means suggested.

I claim:

1. In a vehicle, a suporting member, a pair of wheel spindle arms mounted on said member for up-and-down movement in parallel vertical planes, a wheel spindle on each arm and a vehicle wheel on each spindle, compensating means interconnecting said arms whereby downward movement of one arm will normally produce upward movement of the other arm, warning indicator push-button switches located in fixed positions on said suporting member above each of said arms in the same vertical planes with said arms respectively, said push-button switches adapted to be actuated by said arms when said arms are raised an excessive amount, whereby deflation of the tire on one of said wheels, causing that wheel to be lowered and the other wheel to be raised, will result in the actuation of the push-button swtich associated with the spindle arm of said other wheel.

2. In a vehicle, a pair of wheel spindle arms mounted for up-and-down movement in parallel vertical planes, a wheel spindle on each arm and a vehicle wheel on each spindle, compensating means interconnecting said arms whereby downward movement of one arm will normally produce upward movement of the other arm, warning indicator control elements located in fixed positions above each of said arms and in the same vertical planes wtih said arms respectively, springs mounted on said arms and adapted to actuate said control elements respectively when said arms are raised an excessive amount, whereby deflation of the tire on one of said wheels, causing that wheel to be lowered and the other wheel to be raised, will result in the actuation of the control element associated with the spindle arm of said other wheel, and whereby either of said springs, when caused by a deflated tire to actuate a control element, will nevertheless permit further functioning of the compensating means.

GLENN L. LARISON.

REFERENCES CITED

The following references are of record in the file of this patent:

UNITED STATES PATENTS

| Number | Name | Date |
|---|---|---|
| 2,021,568 | North | Nov. 19, 1935 |

FOREIGN PATENTS

| Number | Country | Date |
|---|---|---|
| 380,901 | Great Britain | Sept. 29, 1932 |
| 393,572 | Great Britain | June 6, 1933 |